United States Patent [19]

Konno et al.

[11] Patent Number: 5,073,422
[45] Date of Patent: Dec. 17, 1991

[54] PRESSURE-SENSITIVE ADHESIVE STRUCTURE

[75] Inventors: Hiroki Konno; Hirofumi Kishita, both of Annaka, Japan

[73] Assignee: Shin-Etsu Chemical Co., Ltd., Tokyo, Japan

[21] Appl. No.: 282,320

[22] Filed: Dec. 9, 1988

[30] Foreign Application Priority Data

Nov. 12, 1987 [JP] Japan .................... 62-313347

[51] Int. Cl.$^5$ .................... C09J 7/02; B32B 27/28
[52] U.S. Cl. .................... 428/40; 428/352; 528/15; 528/31; 528/32; 528/42
[58] Field of Search .................... 428/40, 352; 528/15, 528/31, 32, 42

[56] References Cited

U.S. PATENT DOCUMENTS

| | | | |
|---|---|---|---|
| 3,012,006 | 12/1961 | Holbrook | 428/429 |
| 4,736,048 | 4/1988 | Brown | 556/454 |
| 4,985,526 | 1/1991 | Kishita | 528/15 |

FOREIGN PATENT DOCUMENTS 2096631 10/1982 United Kingdom .

*Primary Examiner*—Jenna Davis
*Attorney, Agent, or Firm*—Oblon, Spivak, McClelland, Maier & Neustadt

[57] ABSTRACT

A pressure-sensitive adhesive structure such as a pressure-sensitive adhesive tape, label or the like having a release agent layer, wherein said release agent layer comprises a cured fluorosilicone composition comprising:

(a) a particular organopolysiloxane having in its molecule silicon-bonded alkenyl groups and at least one member selected from the group consisting of silicon-bonded fluorine-containing substituents represented respectively by Formulas (1) to (4):

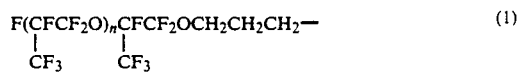

(1)

where n is an integer of 1 to 5.

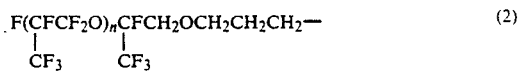

(2)

where n is an integer of 1 to 5.

$C_mF_{2m+1}CH_2CH_2OCH_2CH_2CH_2-$  (3)

where m is an integer of 3 to 10.

$C_mF_{2m+1}CH_2OCH_2CH_2CH_2-$  (4)

where m is an integer of 3 to 10.

(b) an organohydrogenpolysiloxane; and
(c) a catalyst, in a particular proportion. The release properties of the release agent layer show good and high stability with time, promising practical utilities over a long period of time.

17 Claims, 2 Drawing Sheets

PRESSURE-SENSITIVE ADHESIVE STRUCTURE

BACKGROUND OF THE INVENTION

1. Field of the Invention

This invention relates to a pressure-sensitive adhesive structure (or structural body).

2. Description of the Prior Art

Pressure-sensitive adhesive structures comprising a substrate and a pressure-sensitive adhesive layer (a layer comprising a pressure-sensitive adhesive) laminated on both sides each or one side of the substrate, a release agent layer, and optionally further a laminating substrate, as exemplified by pressure-sensitive adhesive tapes and pressure-sensitive adhesive labels, are used in various purposes. In recent years, as pressure-sensitive adhesives used in the pressure-sensitive adhesive structures, silicone pressure-sensitive adhesives mainly composed of dimethylpolysiloxane (hereinafter referred to as dimethylpolysiloxane-based pressure-sensitive adhesives) are used in extensive use because of their excellent heat resistance, cold resistance, chemical resistance, electrical insulating properties and nontoxicity.

However, because of a very strong adhesion, the dimethyl polysiloxane pressure-sensitive adhesives require an excessively large peel force when the pressure-sensitive adhesive layer is peeled from the release agent layer in the case of conventional pressure-sensitive adhesive structures, and the peel force of the pressure-sensitive adhesive layer from the release agent layer remarkably increases particularly when the pressure-sensitive adhesive structures are stored for a long period of time, so that the pressure-sensitive adhesive layer or release agent layer may be readily destroyed when the pressure-sensitive adhesive layer is peeled from the release agent layer. Or components in the release agent layer may migrate into the pressure-sensitive adhesive layer to reduce adhesion possesed by the pressure-sensitive adhesive layer during a long period storage. As the results, the structures may often become of no use as pressure-sensitive adhesive structures.

Now, an object of this invention is to provide a pressure-sensitive adhesive structure that may require a small peel force and have good release properties even when the dimethylpolysiloxane-based pressure-sensitive adhesives are used, and can retain its good release properties with a high stability even after its storage for a long period of time.

SUMMARY OF THE INVENTION

As a structure that can solve the above problems, this invention provides a pressure-sensitive adhesive structure comprising a substrate layer, a pressure-sensitive adhesive layer (or a layer comprising a pressure-sensitive adhesive) and a release agent layer, wherein said release agent layer comprises a cured product of a curable fluorosilicone composition comprising;

(a) an organopolysiloxane having in one molecule at least two silicon-bonded alkenyl groups and containing in one molecule at least one member selected from the group consisting of silicon-bonded fluorine-containing substituents represented respectively by Formulas (1) to (4):

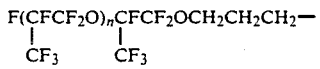

where n is an integer of 1 to 5.

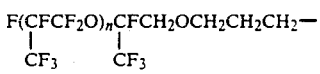

where n is an integer of 1 to 5.

$$C_mF_{2m+1}CH_2CH_2OCH_2CH_2CH_2— \quad (3)$$

where m is an integer of 3 to 10.

$$C_mF_{2m+1}CH_2OCH_2CH_2CH_2— \quad (4)$$

where m is an integer of 3 to 10.

(b) an organohydrogenpolysiloxane having in one molecule at least three silicon-bonded hydrogen atoms; and (c) a catalyst for addition reaction between said silicon-bonded alkenyl groups and said silicon-bonded hydrogen atoms;

the proportion of said silicon-bonded hydrogen atoms in Component (b) to said silicon-bonded alkenyl groups in Component (a) being at least 0.5.

In the pressure-sensitive adhesive structure of this invention, the fluorosilicone release agent layer has remarkably better release properties than the conventional ones even with respect to dimethylpolysiloxane-based pressure-sensitive adhesives, so that it may not occur that the pressure-sensitive adhesive layer and release agent layer are destroyed in releasing. Moreover, this good release properties can be highly stable over a long period of time. The pressure-sensitive adhesive structure having such a release agent layer is also superior in the weathering resistance and discoloration resistance. In the case where a rubber is employed as the material of the substrate layer, the structure of this invention can further be applied in various and multipurpose uses, as a pressure-sensitive adhesive structure sufficiently provided with the properties possessed by the substrate, i.e., the good resiliency, heat insulating properties, and electrical insulating properties.

DETAILED DESCRIPTION OF THE INVENTION

Figure 1:
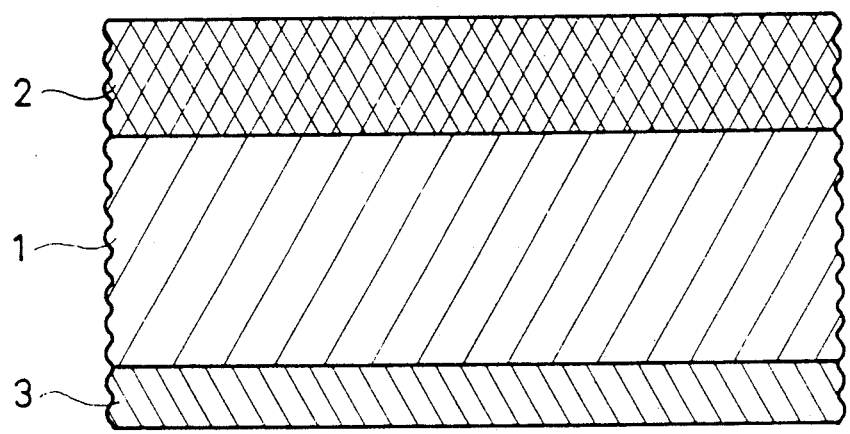
FIG. 1 to FIG. 4 are cross sections schematically illustrating cross-sectional constitution of the embodiments of the pressure-sensitive adhesive structures according to this invention.

The pressure-sensitive adhesive structure of this invention has the three kinds of layers as previously described, and usually comprises a substrate and laminated thereon at least one pressure-sensitive adhesive layer and at least one release agent layer. When plural pressure-sensitive adhesive layers and/or plural release agent layer are present therein, they may be positioned on the same one side of the substrate layer, or may be positioned on both sides thereof.

The pressure-sensitive adhesive structure of this invention may not be limited to have only the above substrate layer, pressure-sensitive adhesive layer and release agent layer, but may optionally have an additional layer, e.g., a laminating substrate, between any two layers, or on an outermost side, of the above three kinds of layers. This laminating substrate may be appropriately selected and used depending on the functions required in the pressure-sensitive adhesive structure, its purpose, etc., and there are no particular limitation on its material, etc. As materials therefor, however, inexpensive materials such as paper are used since it is peeled and thrown away when the pressure-sensitive adhesive structure is put into use. Its thickness or the like may also be appropriately selected depending on the use, functions and so forth.

Structural examples of the pressure-sensitive adhesive structure of this invention include those illustrated in the drawings.

The example illustrated in FIG. 1 is a structure in which a pressure-sensitive adhesive layer 2 is laminated on one side of a substrate layer 1 and a release agent layer 3 is laminated on the other side thereof. When this structure is prepared into a continuous tape, it can be used as a single-sided pressure-sensitive adhesive tape. When this single-sided pressure-sensitive adhesive tape is rolled up on a paper core or the like, the pressure-sensitive adhesive layer is rolled up in such a state that it comes into contact with the release agent layer, so that the pressure-sensitive adhesive layer can be readily peeled from the release agent layer when used. This pressure-sensitive adhesive structure can also be prepared in the form of a single-sided pressure-sensitive adhesive sheet.

Figure 2:
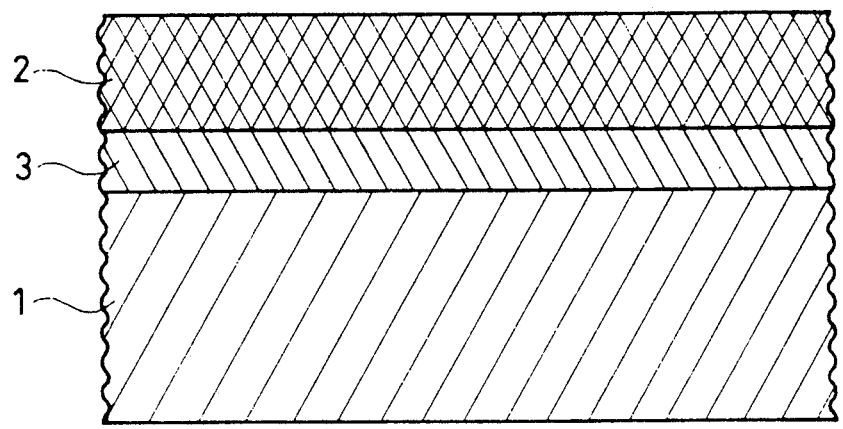

Next, the example illustrated in FIG. 2 is a structure in which a release agent layer 3 is laminated on one side of a substrate layer 1 and a pressure-sensitive adhesive layer 2 is laminated thereon. This also is a pressure-sensitive adhesive structure that can be rolled up on a paper core or the like, and can be used as pressure-sensitive adhesive sheets or single-sided pressure-sensitive adhesive tapes.

Figure 3:
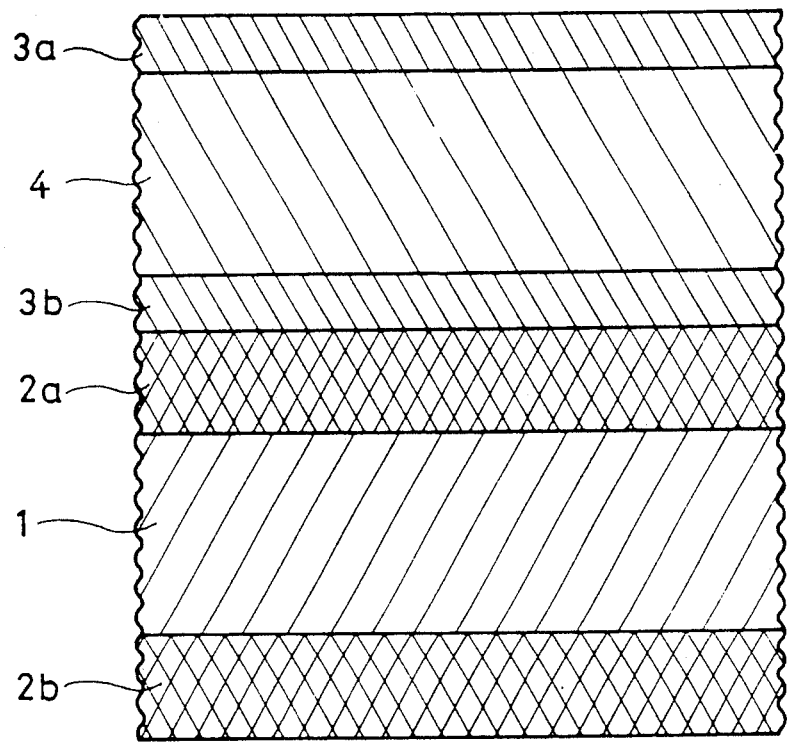

The example further illustrated in FIG. 3 is a structure in which a laminating substrate 4 laminated on its both sides with release agent layers 3a, 3b and a substrate layer 1 laminated on its both sides with pressure-sensitive adhesive layers 2a, 2b are laminated. This structure also can be rolled up on a paper core or the like, and can be used as double-sided pressure-sensitive adhesive sheets or double-sided pressure-sensitive adhesive tapes. When used, the pressure-sensitive adhesive layer can be readily peeled from the release agent layer.

Figure 4:
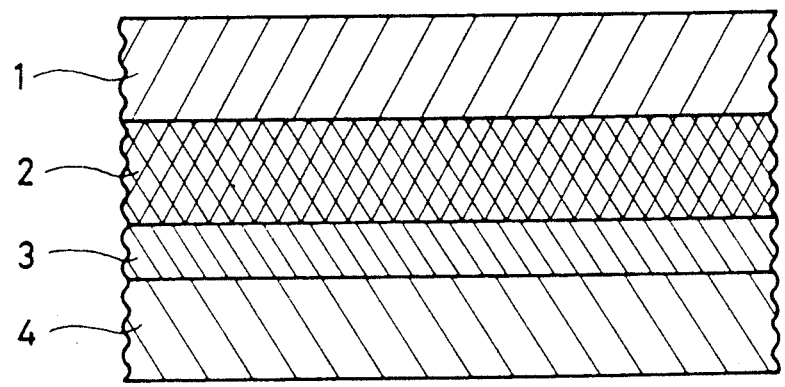

The example last illustrated in FIG. 4 is a structure in which a substrate layer 1 laminated on its one side with a pressure-sensitive adhesive layer 2 and a laminating substrate 4 laminated on its one side with a release agent layer 3 are laminated. This structure can be prepared as pressure-sensitive adhesive labels, pressure-sensitive adhesive sheets or the like that are not stored particularly in a rolled-up state.

The materials for the substrate layer of the pressure-sensitive adhesive structure of this invention are selected depending on the use, functions and so forth of the pressure-sensitive adhesive structure, and there are no particular limitations on them, but they may include, for example, papers, rubbers, PET sheets, Kapton sheets, metal foil, Teflon sheets, and asbestos cloth. Fluororubber and silicone rubber, for example, can be used as the rubbers. When rubbers are used as the substrate, pressure-sensitive adhesive structures can be obtained as having excellent resiliency, heat insulating properties and electrical insulating properties.

The fluororubber includes, for example, fluororubbers of the Viton series, produced by Du Pont Co., the Fluorel series, produced by 3M Company, the Daiel series, produced by Daikin Industries, Ltd., and the Afras series, produced by Asahi Glass Co., Ltd., which are commercially available and widely used. The silicone rubber includes, for example, silicone rubbers of the KE, FE, SEP series, produced by Shin-Etsu Chemical Co., Ltd., the SH, SE, SRX series, produced by Toray Silicone Co., Ltd., the TSE, YE series, produced by Toshiba Silicone Co., Ltd., and the SS, WCa, HS, Silastic series, produced by Dow-Corning Corp.

These rubbers are used in the shape of a sheet. If the rubber sheet is excessively thick, it follows that (1) a large force is required to expand the resulting structure, (2) it may be impossible to lap-wind the resulting structure into a uniform roll, (3) the followability of the pressure-sensitive adhesive layer against uneven surfaces onto which the resulting structure is to be sticked, may be lowered, or (4) the weight and the thickness of the resulting structure increase. Accordingly, they may preferably be made to have a thickness of about 0.01 to 10 mm.

The substrate layer may also be made to have a rough surface on the surface on which the pressure-sensitive adhesive layer or release agent layer is laminated, so that the anchorage effect of pressure-sensitive adhesives or releasing agents can be enhanced. This rough surface can be obtained by a method such as matting commonly used, embossing used when sheets or films are prepared, or vulcanization carried out by laminating unvulcanized rubber on a matted sheet of PET or the like.

Fillers as exemplified by reinforcing resinous materials such as carbon fiber, glass cloth, whisker, and aramid fibers; functional mixing materials, which are materials capable of imparting functions such as magnetism, light-emission, electrical conduction, contraction, water-absorption, and adhesion; metal powders; and oxides or hydroxides of metals may also be added in the substrate layer, or various surface treatments such as laminating, adhesion-imparting treatment and plasma treatment can further be applied on it. In particular, addition of these fillers makes rough the contact surface with the pressure-sensitive adhesives or release agents, thus making it possible to enhance the anchorage effect of pressure-sensitive adhesives and release agents.

If no sufficient anchorage effect can be obtained by the above procedures, the bonding between layers can be enhanced by previously applying a primer, an adhesive or the like on the surface of the substrate layer followed by formation of the pressure-sensitive adhesive or release agent layer. In this instance also, the primer, adhesive or the like may preferably be laminated on the surface-roughened substrate layer.

The pressure-sensitive adhesive structure of this invention has a pressure-sensitive adhesive layer. This pressure-sensitive adhesive layer can be obtained by coating an adhesive on the surface of the substrate layer, etc. according to a conventional method to have a thickness of usually from about 10 to about 300 micrometers, and preferably from about 20 to about 80 micrometers, followed by heating at 50° to 300° C. Here, an excessively small thickness may result in incomplete followability against the unevenness on the substrate surface or cause coating nonuniformity, bringing about a weakness in the pressure-sensitive properties to be obtained. Also, an excessively large thickness may bring about not only the disadvantage that the cost for the pressure-sensitive adhesive structure increases, but also no improvement particularly in the adhesion.

The pressure-sensitive adhesive used in the above pressure-sensitive adhesive layer includes silicone pressure-sensitive adhesives, acrylic pressure-sensitive adhesives, rubbery pressure-sensitive adhesives, phenolic pressure-sensitive adhesives, SIS (styrene/isopurene copolymer) pressure-sensitive adhesives, EVA (ethylene/vinyl acetate copolymer) pressure-sensitive adhesives, and SBS (styrene/butadiene copolymer) pressure-sensitive adhesives. These pressure-sensitive adhesives can be grouped into an emulsion type, a solvent type and a non-solvent type, any of these can be used. In view of high adhesion, preferred are dimethylpolysiloxane-based pressure-sensitive adhesives, acrylic pressure-sensitive adhesives, natural rubber pressure-sensitive adhesives, isobutylene pressure-sensitive adhesives and SIS pressure-sensitive adhesives. If any of these pressure-sensitive adhesive is used, good release properties, also having a high stability with time, can be also obtained according to the invention. These can be used alone or in combination of two or more kinds.

The above pressure-sensitive adhesives may be commercially available under the tradenames, KR-130, KR-120, KR-101-10, produced by Shin-Etsu Chemical Co., Ltd.; YR 3340 produced by Toshiba Silicone Co., Ltd.; DC 282, produced by Dow Corning Corp.; BPS 2411, 8170, 5127, produced by Toyo Ink Mfg. Co., Ltd.; SK-801B, produced by Soken Chemical and Engineering Co., Ltd.; and FL, FA, PK, R, E5, DK, HM, SR, C, FYN, A2, N, produced by Dainippon Ink & Chemicals, Incorporated.

The structure of this invention has a release agent layer. This release agent layer can be obtained by coating a release agent on the surface of the substrate layer, etc. according to a conventional method to have a thickness of usually from about 0.1 to about 50 micrometers, and preferably from about 1 to about 10 micrometers followed by heating at 50° to 300° C. An excessively thin release agent layer may result in incomplete followability against unevenness of the surface, making poor the release properties. Also, an excessively thick layer may weaken the adhesion of pressure-sensitive adhesives, additionally causing an increase in the cost.

The curable fluorosilicone composition used in the above release agent layer in this invention is disclosed in Japanese Patent Application No. 230750/1987, U.S. patent application Ser. No. 07/243,628 filed on Sept. 13, 1988 and European Patent Application No. 88308438.6 filed on Sept. 14, 1988 and Finnish Patent Application No. 884221 filed on Sept. 14, 1988. In the Component (a) alkenyl group-containing organopolysiloxane used in said composition, the alkenyl group may preferably be a vinyl group or an allyl group from the viewpoint of practical use, and at least two alkenyl groups are required to be contained in one molecule. This organopolysiloxane may preferably be straight-chain, and exemplified by an organopolysiloxane represented by the following Formula (5):

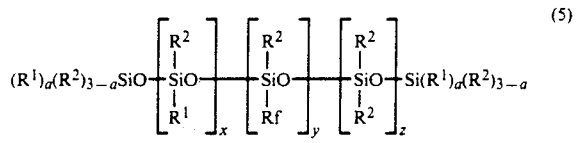

wherein $R^1$ may be the same or different and each represent a $C_2$ to $C_8$ alkenyl group such as a vinyl group or allyl group; and $R^2$ may be the same or different and each represent a $C_1$ to $C_8$ alkyl group such as a methyl group, an ethyl group, a propyl group or a butyl group, or a phenyl group. Rf represents at least one selected from the group consisting of the fluorine-containing substituents represented by the above Formulas (1) to (4); and x, y and z are integers of $x \geqq 0$, $y \geqq 1$ and $z \geqq 0$, respectively.

In Component (A), the fluorine-containing substituent may preferably be contained in an amount of 3 mol % or more of the whole silicon-bonded organic groups. The amount otherwise less than this may result in poor release properties.

Among the organopolysiloxanes of Formula (5), one of examples with high practical utility is a vinyl group-terminated organopolysiloxane represented by Formula (6):

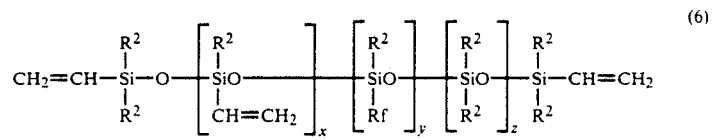

wherein $R^2$, Rf, x, y and z are as defined in the above Formula (5).

The organopolysiloxane represented by the above Formula (6) can be prepared, for example, by subjecting in an appropriate proportion depending on purposes, an organocyclotrisiloxane having the fluorine-containing substituent, represented by Formula (7):

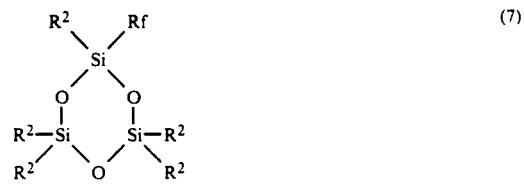

wherein $R^2$ and Rf are as defined in the above Formula (5), and a vinyl group-terminated organosiloxane represented by the formula (8):

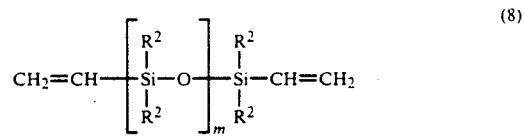

wherein $R^2$ is as defined in the above Formula (5), and m is an integer of 1 or more, optionally, together with an organocyclotrisiloxane represented by Formula (9):

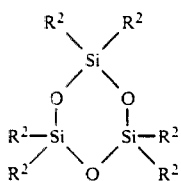

where $R^2$ is as defined in Formula (5), and/or an organocyclotrisiloxane represented by Formula (10):

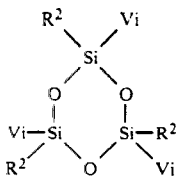

wherein $R^2$ is as defined in Formula (5) and Vi represents a vinyl group, to known equilibration in the presence of an acid or alkaline catalyst to effect polymerization.

The organocyclotrisiloxane having the fluorine-containing substituent of Formula (7) used in the preparation process exemplified above, can be synthesized, for example, by reacting a disiloxanediol represented by the formula (11):

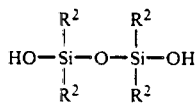

wherein $R^2$ is as defined in the above Formula (5), and a dichlorosilane represented by Formula (12):

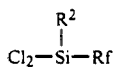

wherein $R^2$ and Rf are as defined in the above Formula (5), in the presence of an amine such as triethylamine, pyridine, dimethylaniline, diethylamine or urea as a catalyst. The catalyst may preferably be added in an amount of from 1 to 6 mol, particularly from 2 to 3 mol, per mol of the dichlorosilane compound. The reaction may preferably be carried out at a temperature of from 0° to 100° C., particularly from 30° to 70° C.

The above reaction can be carried out, for example, by separately preparing the respective solutions of the compounds of the above Formulas (11) and (12), and adding these in a solution containing the catalyst. Preferred as solvents for the disiloxanediol of Formula (11) are polar solvents such as methyl ethyl ketone, acetone and ethyl acetate, and preferred as solvents for the dichlorosilane compound of Formula (12) are fluorinated hydrocarbon solvents such as m-xylene hexafluoride, perfluorooctane and 1,1,2-trichlorotrifluoroethane.

The Component (b) organohydrogenpolysiloxane may preferably have at least one selected from the silicon-bonded fluorine-containing substituents of the above Formulas (1) to (4). This fluorine-containing substituent may preferably be contained in an amount of 3 mol % or more of the whole silicon-bonded organic groups in view of compatibility with said Component (a) and release properties obtained. Other substituents than the silicon-bonded fluorine-containing substituent are an alkyl group having 1 to 8 carbon atoms such as a methyl group, an ethyl group or a propyl group, or a phenyl group. The polysiloxanes of Component (b) are exemplified by polymers comprised of an $R^2HSiO$ unit, an $HSiO_{1.5}$ unit, an $(R^2)_2SiO$ unit, an $R^2SiO_{1.5}$ unit, an $(R^2)_2HSiO_{0.5}$ unit, an $(R^2)_3SiO_{0.5}$ unit, an $R^2RfSiO$ unit and an $RfSiO_{1.5}$ unit, wherein $R^2$ and Rf are as defined in the above Formula (5), which may be any of linear, branched and cyclic ones.

From the viewpoint of practical use, Component (b) may preferably be a linear compound represented, for example, by the following Formula (13):

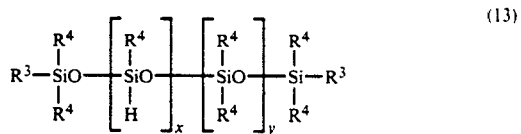

wherein $R^3$ may be the same or different and each represent a hydrogen atom, a $C_1$ to $C_8$ alkyl group or a phenyl group; $R^4$ may be the same or different and each are selected from the group consisting of a $C_1$ to $C_8$ alkyl group, a phenyl group, the fluorine-containing substituents represented by the above Formulas (1) to (4) and a fluorine-containing substituent represented by the following Formula (14):

where $R^5$ represents a $C_1$ to $C_8$ perfluoroalkyl group; x is an integer of 1 or more, and y is an integer of 0 or more, provided that x is a number that makes the number of the silicon-bonded hydrogen atoms in the molecule come to 3 or more.

As shown by Formula (13), the Component (b) organopolysiloxane does not necessarily have any of the fluorine-containing substituents represented by Formulas (1) to (4) or Formula (14), as $R^4$. However, when, for example, all of $R^4$ in Formula (14) are alkyl groups or phenyl groups, it may sometimes occur that the Component (b) organohydrogenpolysiloxane has a poor compatibility with said Component (a) alkenyl group-containing organopolysiloxane, causing coating nonuniformity when the composition is applied. Accordingly, at least part of $R^4$ may preferably comprise the fluorine-containing substituent, and particularly may preferably comprise any of the fluorine-containing substituents of Formulas (1) to (4).

The organohydrogenpolysiloxane of Formula (13) can also be prepared, for example, by a known method using equilibration of corresponding linear siloxanes and cyclic siloxanes. The fluorine-containing substituents of Formulas (1) to (4) can be introduced by using the organocyclotrisiloxane represented by the above Formula (7).

The Component (c) is a catalyst for causing addition between Component (a) and Component (b), and there can be used catalysts known as those for addition of SiH to $SiCH=CH_2$. As such catalysts, well known are metals as exemplified by platinum, rhodium and iridium and compounds of these. Preferred catalysts are platinum catalysts as exemplified by chloroplatinic acid, complex salts of chloroplatinic acid with various sorts of olefins or vinylsiloxanes, platinum black, and platinums supported on all sorts of carriers.

Component (c) may be added in an amount that is commonly used in curable silicone compositions utilizing the addition reaction of this type, i.e., in an amount ranging from 1 to 1,000 ppm in terms of platinum based on total weight of Component (a) and Component (b).

Component (a) and Component (b) are used in a relative proportion in the composition such that the number of the silicon-bonded hydrogen atoms in Component (b) may come to at least 0.5 per one silicon-bonded alkenyl group in Component (a). Preferably, the proportion of the silicon-bonded hydrogen atoms in Component (b) to the silicon-bonded alkenyl groups in Component (a) may be of from 0.5:1 to 10:1, and more preferably from 1:1 to 5:1.

The composition used in this invention can be obtained by mixing the above respective Components (a), (b) and (c) in given amounts, but, for the purpose of restraining the activity of the Component (c) catalyst, there may be optionally added retardants such as various sorts of organic nitrogen compounds, organic phosphorus compounds, acetylene compounds, oxime compounds and organic chlorinated compounds. The present composition may also be diluted according to use circumstances, with appropriate organic solvents such as chlorofluorocarbons, xylene hexafluoride, benzotrifluoride, perfluorooctane, and methyl ethyl ketone. The composition of this invention may further optionally contain dyes, pigments and reinforcing fillers.

The above curable silicone composition thus obtained may be applied by known techniques such as roll coating, spray coating and dipping, depending on substrates to be coated, coating amounts, etc.

After application on a substrate, the above curable silicone composition can be cured by known techniques such as room-temperature curing, heat curing and ultraviolet curing, preferably by heat curing, for example, at 100° C. for 30 seconds or more, so that a film having a low surface energy can be formed.

The pressure-sensitive adhesive structure of this invention can be used in various purposes, but, because of its excellent heat resistance, cold resistance, chemical resistance and electrical insulating properties, can be suitably used, for example, as heat dissipation tapes for transistors, electric wire coatings, terminating tapes for covering rubber tubes, electrical insulating tapes or sheets, construction sealing tapes or sheets, freezed food labels or sheets, refrigerator sealing tapes or sheets, and tapes or sheets for adhering or connecting a contact or rubbery molded product of medical equipments that comes into contact with a human body.

EXAMPLES

This invention will be described below in greater detail by giving Examples and Comparative Examples.

PREPARATION EXAMPLE

A composition for use in the release agent used in Examples and Comparative Examples was prepared in the following procedures.

SYNTHESIS OF VINYL GROUP-CONTAINING ORGANOPOLYSILOXANE

A cyclotrisiloxane having a fluorine-containing substituent represented by the formula:

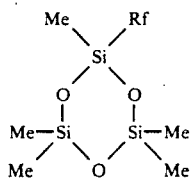

where Rf is

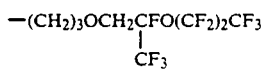

and 1,1,3,3-tetramethyl-1,3-divinyldisiloxane were mixed in molar ratio of 120:1, and with stirring 0.2 part by weight of $CF_3SO_3H$ was added to 100 parts by weight of the resulting mixture to carry out reaction (equilibration) at room temperature for 10 hours. Thereafter, 0.2 part by weight of 28% $NH_3$ water was added, and the mixture was stirred at room temperature for 1 hour, followed by filtration of produced salt with a filter paper and then stripping at 150° C. under 5 mmHg for 1 hour to obtain vinyl group-containing organocyclosiloxane as shown by the following formula:

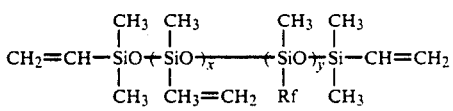

where Rf is

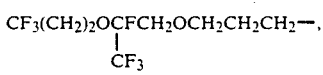

x is 240, and y is 120.

SYNTHESIS OF ORGANOHYDROGENPOLYSILOXANE (H-1)

Cyclotrisiloxane represented by the formula:

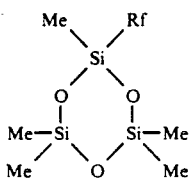

where Rf is

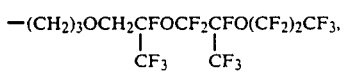

methylhydrogencyclotetrasiloxane, and hexamethyldisiloxane serving as a chain terminator were mixed in molar ratio of 50:6.25:1, and thereafter equilibration was effected by adding $CF_3SO_3H$, followed by neutralization with $NH_3$ water, filtration and stripping, following the synthesis of the above vinyl group-containing organopolysiloxane, to obtain organohydrogenpolysiloxane as shown by the following formula:

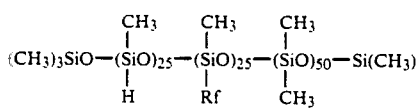

where Rf is a group represented by the formula:

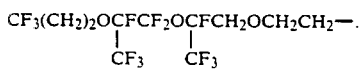

The vinyl group-containing organopolysiloxane and organohydrogenpolysiloxane obtained in the above manner were so mixed that the ratio of SiH groups possessed by the former to Si—CH=CH$_2$ groups possessed by the latter may come to 2.0, and, to 15 parts by weight of the resulting mixture, 0.15 part by weight of a complex of chloroplatinic acid with vinyl siloxane (platinum concentration: 2%) and 85 parts by weight of MXHF (methaxylene hexafluoride) were added to obtain the composition.

EXAMPLE 1

A release agent layer and a pressure-sensitive adhesive layer were formed on each of two kinds of substrate layer according to the procedures described below, thereby obtaining two kinds of pressure-sensitive adhesive structure having the constitution as illustrated in FIG. 1.

Substrate layer: Two kinds were used, one of which is a silicone rubber sheet (TC-45A, produced by Shin-Etsu Chemical Co., Ltd.; thickness: 0.45 mm) and the other of which is a fluororubber sheet (Viton B-50, produced by Du Pont Co.; thickness: 1 mm).

Release agent layer: A 5% solution of the composition obtained in the above Preparation Example in Freon TF (trademark; produced by Mitsui Du Pont) was coated using a bar coater on the surface of the substrate layer, followed by heating at 200° C. for 10 minutes to form a layer of 1 micrometer in thickness.

Pressure-sensitive adhesive layer: A dimethylpolysiloxane-based pressure-sensitive adhesive (KR-130, produced by Shin-Etsu Chemical Co., Ltd.) was coated using a bar coater on the surface of the substrate layer, of the side opposite to the release agent layer, followed by heating at 200° C. for 10 minutes to form a layer of 60 micrometers in thickness.

EXAMPLE 2

Example 1 was repeated to obtain pressure-sensitive adhesive structures having the constitution as illustrated in FIG. 2, except that a Daiel G-621 of 2 mm in thickness, produced by Daikin Industries, Ltd. was used as the fluororubber sheet in place of Viton B-50 to form the pressure-sensitive adhesive layer on the release agent layer.

EXAMPLE 3

Two kinds of pressure-sensitive adhesive structures having the constitution as illustrated in FIG. 3 and each having a substrate layer made of a different material, were prepared as follows. A substrate layer having pressure-sensitive adhesive layers on its both sides and a laminating substrate having release agent layers on its both sides were prepared in the procedures described below, and then these were laminated, thus obtaining.

Substrate layer: Two kinds were used, one of which is a silicone rubber sheet (TC-30A sheet, produced by Shin-Etsu Chemical Co., Ltd.; thickness: 0.3 mm) and the other of which is a fluororubber sheet (a 1 mm thick sheet comprised of Fluorel FC-2176, produced by 3M Company).

Laminating substrate: Blue glassine paper (thickness: 60 g/m$^2$), produced by Shikoku Paper Mfg. Co., Ltd.

Release agent layer: A 5% MXHF (methaxylene hexafluoride) solution of the composition in the above Preparation Example was coated on both sides of the laminating substrate, followed by heating at 150° C. for 30 minutes to form a layer of 1.5 g/m$^2$ in thickness.

Pressure-sensitive adhesive layer: Formed on both sides of the substrate layer in the same manner as in Example 1.

The laminating substrate provided with the release agent layers on its both sides was laminated on one side of the substrate layer provided with the pressure-sensitive adhesive layers on its both sides to obtain pressure-sensitive adhesive structures.

EXAMPLE 4

The substrate layer, release agent layer and pressure-sensitive adhesive layer described below were formed and the laminating substrate described below was laminated thereon, to prepare two kinds of pressure-sensitive adhesive structures having the constitution as illustrated in FIG. 4 and each having a substrate layer made of a different material.

Substrate layer: Two kinds were used, one of which is a silicone rubber sheet (TC-20A sheet, produced by Shin-Etsu Chemical Co., Ltd.; thickness: 0.2 mm) and the other of which is a fluororubber sheet (a 1 mm thick sheet comprised of Daiel G-801, produced by Daikin Industries, Ltd.).

Laminating substrate: The same as used in Example 3 was used.

Pressure-sensitive adhesive layer: Formed on one side of the substrate layer in the same manner as in Example 3.

Release agent layer: Formed on one side of the laminating substrate in the same manner as in Example 3.

Next, the surface of the laminating substrate on which the release agent layer was provided was laminated on the surface of the substrate layer on which the pressure-sensitive adhesive layer was provided, to obtain pressure-sensitive adhesive structures.

EXAMPLE 5

Example 1 was repeated to prepare two kinds of pressure-sensitive adhesive structures having the constitution as illustrated in FIG. 1, except that used as substrate layers were i) a silicone rubber sheet having a roughened surface on its one side (surface roughness: 10 to 50 micrometers), and ii) a fluororubber sheet having a roughened surface on its one side (Daiel G-621, produced by Daikin Industries, Ltd.; thickness: 1 mm). The surface of one side of the silicone rubber sheet and the fluororubber sheet used above had been roughened by heat-curing their green rubber sheet provided on a PET sheet having a surface roughened by matting (surface roughness: 10 to 50 micrometers).

EXAMPLE 6

Example 1 was repeated to prepare two kinds of pressure-sensitive adhesive structures having the constitution as illustrated in FIG. 1, except that used as substrate layers were a silicone rubber sheet 2 mm thick comprised of a composition obtained by blending 200 parts by weight of alumina with 100 parts by weight of a silicone rubber (KE-174U, produced by Shin-Etsu Chemical Co., Ltd.), and a fluororubber sheet 1 mm thick comprised of a composition obtained by blending 200 parts by weight of alumina with 100 parts by weight of a fluororubber (Viton E-60C, produced by Du Pont Co.).

EXAMPLE 7

Example 1 was repeated to prepare two kinds of pressure-sensitive adhesive structures having the constitution as illustrated in FIG. 1, except that used as substrate layers were a glass cloth-incorporated silicone rubber sheet (TC-45AG sheet, produced by Shin-Etsu Chemical Co., Ltd.; thickness: 0.45 mm), and a fluororubber sheet (a 1 mm thick sheet molded by adding glass cloth to Daiel G-501 produced by Daikin Industries, Ltd).

EXAMPLE 8

A silicone rubber sheet (KE-951 sheet, produced by Shin-Etsu Chemical Co., Ltd.; thickness: 0.5 mm) and a fluororubber sheet (a sheet obtained by molding Fluorel FC-2120, produced by 3M Company, to have a thickness of 2 mm) were used as substrate layers, and a release agent layer was respectively formed on each of the substrate layers in the same manner as in Example 1. Further thereon, a pressure-sensitive adhesive tape (Nitoflon No. 903UL, produced by Nitto Electric Industrial Co., Ltd.) comprising Teflon as a substrate was laminated as a laminating substrate to prepare pressure-sensitive adhesive structures having the constitution as illustrated in FIG. 4.

COMPARATIVE EXAMPLE 1

Example 1 was repeated to prepare pressure-sensitive adhesive structures having the constitution as illustrated in FIG. 1, except that a sheet obtained by molding Fluorel FC-2174, produced by 3M Company, to have a thickness of 2 mm was used as the fluororubber sheet, and the release agent layers were formed by using a 5% toluene solution of a silicone release agent (KS-776A, produced by Shin-Etsu Chemical Co., Ltd.) mainly composed of dimethylpolysiloxane.

COMPARATIVE EXAMPLE 2

Example 8 was repeated to prepare pressure-sensitive adhesive structures having the constitution as illustrated in FIG. 4, except that the release agent layers were formed by using a 5% toluene solution of a silicone release agent (KS-776A, produced by Shin-Etsu Chemical Co., Ltd.) mainly composed of dimethylpolysiloxane.

In respect of the pressure-sensitive adhesive structures obtained by the above Examples 1 to 8 and Comparative Examples 1 and 2, the following performances were evaluated.

Performances Evaluated

1) Peel force and adhesion after preparation and after structures have been left to stand at room temperature for 48 hours. (The evaluated results are given in Table 1.)

2) Peel force, adhesion, discoloration resistance and anchorage properties after preparation and after structures have been stored at 100° C. for 24 hours under a constant load of 40 g/cm². (The evaluated results are given in Table 2.)

Evaluation Methods

1) Peel force and adhesion:

The pressure-sensitive structures as illustrated in FIGS. 1, 2 and 3 were tested after the release side of a release paper, which has release coating comprised of the same release agent as used for the release agent layer of the structure, was laminated on the pressure-sensitive adhesive layer of the structures.

A rubber roller with a load of 2 kg, as described in JIS-Z0237, was reciprocated once on each pressure-sensitive structure to make the pressure-sensitive layer bonded sufficiently with the release agent layer. The pressure-sensitive structure thus treated was then cut into strips 19 mm wide. Thereafter, a force necessary for the pressure-sensitive adhesive layer to be peeled from the release agent layer, using a tensile tester at an angle of 180° at a peel rate of 0.3 m/min was measured in a room kept at a constant temperature of 25° C. to determine the peel force. Thereafter, the pressure-sensitive adhesive layer, together with the substrate layer, in the form of a strip 19 mm wide thus peeled was adhered on a PET sheet, on which the above rubber roller with a load of 2 kg was reciprocated once to effect contact bonding, and a force necessary for the adhered PET sheet to be peeled from the pressure-sensitive adhesive layer was measured in the same manner as in the measurement of the peel force to find the adhesion.

2) Anchorage properties and discoloration resistance:

Evaluated by observing the pressure-sensitive adhesive layer and release agent layer when the above peel force and adhesion were measured.

The surface rougness was measured using a surface roughness meter.

Results of measurements are shown in Table 1 and Table 2.

Table 1 and Table 2 tell the following:

First, the release agent layers of the structures according to this invention show better anchorage and discoloration resistance than the silicone release agent layer mainly composed of the dimethyl siloxane hitherto widely used.

Next, the release agent layers of the structures according to this invention do not require a larger force when the pressure-sensitive adhesive layer is peeled therefrom, as compared with the silicone release agent layer mainly composed of the dimethylpolysiloxane. Moreover, even after storage at a high temperature, the pressure-sensitive adhesive layer can be peeled from the release agent layer with a smaller peel force than that for any conventional pressure-sensitive adhesive structure.

TABLE 1

|  | Example 1 | | Example 2 | | Example 3 | | Example 4 | |
|---|---|---|---|---|---|---|---|---|
| Rubber*1: | F | Si | F | Si | F | Si | F | Si |
| Surface roughness*2: μm | 1 | 2 | 1 | 4 | 1 | 3 | 2 | 4 |
| Peel force: g/19 mm | 32 | 21 | 47 | 38 | 49 | 41 | 32 | 26 |
| Adhesion: g/19 mm | 266 | 386 | 242 | 371 | 221 | 352 | 210 | 348 |

|  | Example 5 | | Example 6 | | Example 7 | | Example 8 | |
|---|---|---|---|---|---|---|---|---|
| Rubber*1: | F | Si | F | Si | F | Si | F | Si |
| Surface roughness*2: | 11 | 22 | 14 | 28 | 13 | 13 | 1 | 2 |

TABLE 1-continued

| | | | | | | | | |
|---|---|---|---|---|---|---|---|---|
| Peel force: μm g/19 mm | 34 | 20 | 20 | 13 | 24 | 12 | 35 | 24 |
| Adhesion: g/19 mm | 271 | 302 | 300 | 408 | 302 | 405 | 181 | 290 |

| | Comparative Example 1 | | Comparative Example 2 | |
|---|---|---|---|---|
| Rubber*1: | F | Si | F | Si |
| Surface roughness*2: μm | 1 | 3 | 2 | 4 |
| Peel force: g/19 mm | 100–450 | 100–450 | 100–450 | 100–450 |
| Adhesion: | ≦150 | ≦180 | ≦150 | ≦250 |

*1: Substrate material:
F: fluororubber.
Si: silicone rubber
*2: Difference between a maximum convex portion and a maximum concave portion.

TABLE 2

| | Example 1 | | Example 2 | | Example 3 | | Example 4 | |
|---|---|---|---|---|---|---|---|---|
| Rubber*1: | F | Si | F | Si | F | Si | F | Si |
| Surface roughness*2: μm | 1 | 3 | 1 | 4 | 1 | 3 | 2 | 3 |
| Peel force: g/19 mm | 55 | 40 | 65 | 52 | 68 | 55 | 57 | 40 |
| Adhesion: g/19 mm | 151 | 160 | 121 | 150 | 120 | 153 | 145 | 162 |
| Anchorage*3: | A | A | A | A | A | A | A | A |
| Discoloration resistance*4: | A | A | A | A | A | A | A | A |

| | Example 5 | | Example 6 | | Example 7 | | Example 8 | |
|---|---|---|---|---|---|---|---|---|
| Rubber*1: | F | Si | F | Si | F | Si | F | Si |
| Surface roughness*2: μm | 11 | 22 | 14 | 28 | 13 | 13 | 1 | 2 |
| Peel force: g/19 mm | 41 | 30 | 44 | 31 | 47 | 29 | 62 | 58 |
| Adhesion: g/19 mm | 168 | 172 | 172 | 180 | 173 | 176 | 88 | 110 |
| Anchorage*3: | A | A | A | A | A | A | A | A |
| Discoloration resistance*4: | A | A | A | A | A | A | A | A |

| | Comparative Example 1 | | Comparative Example 2 | |
|---|---|---|---|---|
| Rubber*1: | F | Si | F | Si |
| Surface roughness*2: μm | 1 | 3 | 2 | 4 |
| Peel force: g/19 mm | 200–800 | 180–800 | 200–1,000 | 200–1,000 |
| Adhesion: | ≦50 | ≦75 | ≦40 | ≦60 |
| Anchorage*3: | C | C | C | C |
| Discoloration resistance*4: | B | B | C | C |

*1 and *2 are the same as in Table 1.
*3, *4:
A: good;
B: partly yellowed or layer destroyed; and
C: completely yellowed or layer completely destroyed.

What is claimed is:

1. A pressure-sensitive adhesive structure comprising a substrate layer, a pressure-sensitive adhesive layer and a release agent layer, wherein said release agent layer comprises a cured product of a curable fluorosilicone composition comprising:

(a) an organopolysiloxane having in its molecule at least two silicon-bonded alkenyl groups and containing in its molecule at least one member selected from the group consisting of silicon-bonded fluorine-containing substituents represented respectively by Formulas (1) to (2):

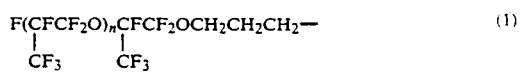

where n is an integer of 1 to 5,

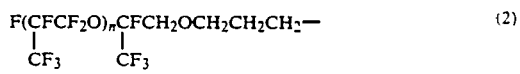

where n is an integer of 1 to 5, (b) an organohydrogenpolysiloxane having in its molecule at least three silicon-bonded hydrogen atoms; and (c) a catalyst for addition reaction between said silicon-bonded alkenyl groups and said silicon-bonded hydrogen atoms;

the proportion of said silicon-bonded hydrogen atoms in Component (b) to said silicon-bonded alkenyl groups in Component (a) being at least 0.5.

2. The pressure-sensitive adhesive structure according to claim 1, wherein Component (a) in said fluorosilicone composition is represented by Formula (5):

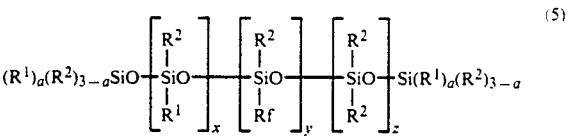

wherein $R^1$ represents a $C_2$ to $C_8$ alkenyl group; $R^2$ may be the same or different and represents a $C_1$ to $C_8$ alkyl group or a phenyl group; Rf represents at least one selected from the fluorine-containing substituents represented by the above Formulas (1) to (2); a is an integer of 1; and x, y and z are integers of $x \geq 0$, $y \geq 1$ and $z \geq 0$, respectively.

3. The pressure-sensitive adhesive structure according to claim 2, wherein Component (a) in said fluorosilicone composition is represented by Formula (6):

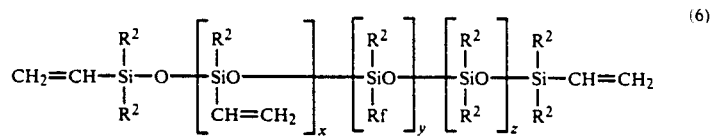

wherein $R^2$, Rf, x, y and z are the same as defined in said Formula (5).

4. The pressure-sensitive adhesive structure according to claim 1, wherein the fluorine-containing substituent in Component (a) in said fluorosilicone composition is contained in an amount of 3 mole % or more of the whole silicon-bonded organic substituents.

5. The pressure-sensitive adhesive structure according to claim 1, wherein the proportion of Si-H in Component (b) to said Si-alkenyl in Component (a) is 0.5:1 to 10:1.

6. The pressure-sensitive adhesive structure according to claim 1, wherein said Component (c) is a platinum catalyst.

7. The pressure-sensitive adhesive structure according to claim 1, comprising a substrate layer, a release agent layer provided on one side of said substrate layer, and a pressure-sensitive adhesive layer provided on the other side of said substrate layer.

8. The pressure-sensitive adhesive structure according to claim 1, comprising a substrate layer, a release agent layer provided on one side of said substrate layer, and a pressure-sensitive adhesive layer provided on said release agent layer.

9. The pressure-sensitive adhesive structure according to claim 1, comprising a substrate layer provided with pressure-sensitive adhesive layers on its both sides, and a laminating substrate layer provided with release agent layers on its both sides; one of said pressure-sensitive adhesive layers and one of said release agent layers being jointed face to face.

10. The pressure-sensitive adhesive structure according to claim 1, comprising a substrate layer, a pressure-sensitive adhesive layer provided on its one side, a release agent layer provided on said pressure-sensitive adhesive layer, and a laminating substrate provided on said release agent layer.

11. The pressure-sensitive adhesive structure according to claim 1, wherein said substrate layer comprises a material selected from the group consisting of paper, a rubber sheet, a PET sheet, a Kapton sheet, metal foil, a Teflon sheet, and asbestos cloth.

12. The pressure-sensitive adhesive structure according to claim 1, wherein said substrate layer has a roughened surface.

13. The pressure-sensitive adhesive structure according to claim 1, wherein said pressure-sensitive adhesive layer comprises at least one selected from the group consisting of a silicone pressure-sensitive adhesive, an acrylic pressure-sensitive adhesive, a rubbery pressure-sensitive adhesive, a phenolic pressure-sensitive adhesive, a styrene/isopropylene copolymer pressure-sensitive adhesive, a styrene/vinyl acetate copolymer pressure-sensitive adhesive, and a styrene/butadiene copolymer pressure-sensitive adhesive.

14. The pressure-sensitive adhesive structure according to claim 1, wherein said pressure-sensitive adhesive layer comprises a silicone pressure-sensitive adhesive mainly composed of dimethylpolysiloxane.

15. The pressure-sensitive adhesive structure according to claim 1, wherein said substrate layer has a thickness of from about 0.01 to 10 mm, said pressure-sensitive adhesive layer has a thickness of about 10 to about 300 micrometers, and said release agent layer has a thickness of from about 0.1 to about 50 micrometers.

16. The pressure-sensitive adhesive structure according to claim 1, wherein Component (b) in said fluorosilicone composition is represented by Formula (13):

$$R^3-SiO\left[\begin{array}{c}R^4\\|\\SiO\\|\\H\end{array}\right]_x\left[\begin{array}{c}R^4\\|\\SiO\\|\\R^4\end{array}\right]_y\begin{array}{c}R^4\\|\\Si-R^3\\|\\R^4\end{array} \quad (13)$$

wherein $R^3$ represents a hydrogen atom, a $C_1$ to $C_8$ alkyl group or a phenyl group; $R^4$ may be the same or different and represents a $C_1$ to $C_8$ alkyl group, a phenyl group, or at least one selected from the group consisting of the fluorine-containing substituents of Formulas (1) to (4) and Formula (14):

$$F(CFCF_2O)_nCFCF_2OCH_2CH_2CH_2- \quad (1)$$
$$\quad | \qquad \qquad |$$
$$\quad CF_3 \qquad CF_3$$

where n is an integer of 1 to 5, $$F(CFCF_2O)_nCFCH_2OCH_2CH_2CH_2- \quad (2)$$
$$\quad | \qquad \qquad |$$
$$\quad CF_3 \qquad CF_3$$

where n is an integer of 1 to 5, $$C_mF_{2m+1}CH_2CH_2OCH_2CH_2CH_2- \quad (3)$$

where m is an integer of 3 to 10, $$C_mF_{2m+1}CH_2OCH_2CH_2CH_2- \quad (4)$$

where m is an integer of 3 to 10, $$R^5CH_2CH_2- \quad (14)$$

wherein $R^5$ represents a $C_1$ to $C_8$ perfluoroalkyl group; and x is an integer of 1 or more, and y is an integer of 0 or more, provided that x is a number that makes the number of the silicon-bonded hydrogen atoms in the molecule come to 3 or more.

17. The pressure-sensitive adhesive structure according to claim 1, wherein at least 3 mol % of the whole silicon-bonded organic groups in Component (b) is selected from the fluorine-containing substituents of Formula (1) to (4) and (14):

$$F(CFCF_2O)_nCFCF_2OCH_2CH_2CH_2- \quad (1)$$
$$\quad | \qquad \qquad |$$
$$\quad CF_3 \qquad CF_3$$

where n is an integer of 1 to 5, $$F(CFCF_2O)_nCFCH_2OCH_2CH_2CH_2- \quad (2)$$
$$\quad | \qquad \qquad |$$
$$\quad CF_3 \qquad CF_3$$

where n is an integer of 1 to 5, $$C_mF_{2m+1}CH_2CH_2OCH_2CH_2CH_2- \quad (3)$$

where m is an integer of 3 to 10, $$C_mF_{2m+1}CH_2OCH_2CH_2CH_2- \quad (4)$$

where m is an integer of 3 to 10, $$R^5CH_2CH_2- \quad (14).$$

* * * * *

UNITED STATES PATENT AND TRADEMARK OFFICE
CERTIFICATE OF CORRECTION

PATENT NO. : 5,073,422

DATED : December 17, 1991

INVENTOR(S) : Hiroki Konno, et al.

It is certified that error appears in the above-identified patent and that said Letters Patent is hereby corrected as shown below:

Title page, item (30):

The priority data are incorrect, should be,
--Dec. 11, 1987   Japan ..........62-313347--.

Signed and Sealed this

Fourth Day of May, 1993

Attest:

MICHAEL K. KIRK

*Attesting Officer*   Acting Commissioner of Patents and Trademarks